(12) United States Patent
Takeda et al.

(10) Patent No.: US 9,837,885 B2
(45) Date of Patent: Dec. 5, 2017

(54) ACTUATOR

(71) Applicant: Nidec Sankyo Corporation, Nagano (JP)

(72) Inventors: Tadashi Takeda, Nagano (JP); Takeshi Sue, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 763 days.

(21) Appl. No.: 14/309,256

(22) Filed: Jun. 19, 2014

(65) Prior Publication Data
US 2014/0375147 A1 Dec. 25, 2014

(30) Foreign Application Priority Data
Jun. 25, 2013 (JP) .................................. 2013-132431

(51) Int. Cl.
*H02K 41/03* (2006.01)
*H02K 41/035* (2006.01)
(52) U.S. Cl.
CPC ................................ *H02K 41/0356* (2013.01)
(58) Field of Classification Search
CPC ... H02K 41/0356; H02K 41/0358; G02B 7/08
USPC ........... 310/12.16, 22, 23, 24, 25, 26, 27, 36
See application file for complete search history.

(56) References Cited

U.S. PATENT DOCUMENTS

| | | | | |
|---|---|---|---|---|
| 9,467,035 B2 * | 10/2016 | Endo | ....................... | B06B 1/045 |
| 2012/0119595 A1 * | 5/2012 | Choi | ....................... | B06B 1/045 310/25 |
| 2014/0077628 A1 * | 3/2014 | Yamada | ................. | H02K 33/16 310/12.16 |

FOREIGN PATENT DOCUMENTS

JP 02-172012 A 7/1990
JP WO 2012/153631 * 11/2012 ............. H02K 33/18

* cited by examiner

*Primary Examiner* — Hanh Nguyen
(74) *Attorney, Agent, or Firm* — Cantor Colburn LLP

(57) ABSTRACT

An actuator may include a drive coil, a drive magnet part, a coil holding body and a magnet holding body. The coil holding body may include a tube part around which the drive coil is wound, and the drive magnet part may include two drive magnet pieces whose opposed faces are magnetized in the same magnetic pole. The coil holding body may be linearly and relatively movable to the magnet holding body. The magnet holding body may include an opening part formed in one of the two end face parts structuring the magnet holding body. The coil holding body may include a protruded part which is protruded to an outer side through the opening part, the protruded part may formed so as to extend over the tube part, and a flat part in a flat face shape may be formed in the protruded part.

21 Claims, 7 Drawing Sheets

ACTUATOR

CROSS REFERENCE TO RELATED APPLICATION

The present invention claims priority under 35 U.S.C. §119 to Japanese Application No. 2013-132431 filed Jun. 25, 2013, the entire content of which is incorporated herein by reference.

FIELD OF THE INVENTION

At least an embodiment of the present invention may relate to an actuator for linearly moving an operation object in a predetermined direction.

BACKGROUND

Conventionally, a magnetic head moving actuator for moving a magnetic head has been known (see, for example, Japanese Patent Laid-Open No. Hei 2-172012). An actuator described in the Patent Literature includes a drive coil, a coil bobbin in a cylindrical tube shape around which the drive coil is wound, permanent magnets and a core which are disposed on an inner peripheral side of the coil bobbin, and a yoke to which the permanent magnets are fixed. The coil bobbin around which the drive coil is wound is accommodated on an inner side with respect to the yoke. The coil bobbin and the yoke are connected with each other through two plate springs. The plate spring is provided with a bobbin fixed part which is fixed to the coil bobbin, a yoke fixed part which is fixed to the yoke, and a spring part which connects the bobbin fixed part with the yoke fixed part. A part of the bobbin fixed part of one of the two plate springs is protruded to an outer peripheral side relative to the yoke and a magnetic head is fixed to the part of the bobbin fixed part which is protruded from the yoke to the outer peripheral side.

In recent years, a small actuator has been required in a market with miniaturization of a portable device such as a cell phone. When an actuator is miniaturized, a relative size of an operation object which is to be operated by the actuator becomes larger relative to the actuator. In the actuator described in the above-mentioned Patent Literature, a magnetic head is an operation object whose relative size to the actuator is extremely small and thus, in this actuator, the magnetic head which is an operation object can be held in a stable state. However, in the actuator described in the Patent Literature, an operation object whose relative size to the actuator is comparatively large is difficult to be held in a stable state.

Further, for convenience of an actuator, an actuator described in the Patent Literature may be desired to structure that a coil bobbin around which a driving coil is wound (in other words, a drive coil side) is attached to a host device on which the actuator is mounted, and that a yoke to which permanent magnets are fixed (in other words, permanent magnet side) is moved. In the actuator described in the Patent Literature, a part of the bobbin fixed part of the plate spring is protruded to an outer peripheral side relative to the yoke but the coil bobbin is accommodated in an inner side of the yoke and thus it is difficult that the drive coil (coil bobbin side) is attached to a host device in a stable state.

SUMMARY

In view of the problem described above, at least an embodiment of the present invention may advantageously provide an actuator which is capable of holding an operation object whose relative size to the actuator is comparatively large in a stable state. Further, in view of the problem described above, at least an embodiment of the present invention may advantageously provide an actuator which is capable of attaching its drive coil side to a host device on which the actuator is mounted in a stable state.

According to at least an embodiment of the present invention, there may be provided an actuator including a drive coil which is wound around in a substantially tube shape, a drive magnet part which is disposed on an inner peripheral side with respect to the drive coil, a coil holding body which holds the drive coil, and a magnet holding body which holds the drive magnet part. The coil holding body is linearly and relatively movable with respect to the magnet holding body and, when a relatively moving direction of the coil holding body with respect to the magnet holding body is referred to as a first direction, the coil holding body includes a tube part in a substantially tube shape whose inner peripheral side is penetrated through in the first direction, and the drive magnet part includes two drive magnet pieces which are disposed so as to overlap with each other in the first direction and whose opposed faces in the first direction are magnetized in the same magnetic pole as each other, and the drive magnet part is disposed on an inner peripheral side with respect to the tube part. The drive coil is wound around on an outer peripheral side of the tube part so as to surround an entire periphery on an outer peripheral side of the drive magnet part. Further, the magnet holding body includes two end face parts, which are disposed on an outer side relative to the drive coil and the drive magnet part in the first direction and which structure both end faces of the magnet holding body in the first direction, a side face part which is disposed so as to surround an outer peripheral side of the drive coil and which structures an outer peripheral face of the magnet holding body in a radial direction of the tube part which is perpendicular to the first direction, and an opening part which is formed in one of the two end face parts so as to penetrate in the first direction. The coil holding body is provided with a protruded part, a part of which is disposed in the opening part and which is protruded to an outer side in the first direction from one of the two end face parts, and the protruded part is formed so as to extend over the tube part in the radial direction of the tube part, and a flat part in a flat face shape which is perpendicular to the first direction is formed in the protruded part which is protruded from the end face part.

In the actuator in accordance with an embodiment of the present invention, the magnet holding body which holds the drive magnet part includes two end face parts which are disposed on an outer side relative to the drive coil and the drive magnet part in the first direction and which structure both end faces of the magnet holding body in the first direction, and the coil holding body which holds the drive coil is provided with a protruded part, a part of which is disposed in the opening part formed in one of the two end face parts and which is protruded to an outer side in the first direction from one of the two end face parts. Further, in the embodiment of the present invention, the protruded part is formed so as to extend over the tube part formed in a substantially tube shape in the radial direction of the tube part, and a flat part in a flat face shape which is perpendicular to the first direction is formed in the protruded part which is protruded from the end face part. According to the embodiment of the present invention, the protruded part is formed so as to extend over the tube part formed in a substantially tube shape in the radial direction of the tube part and thus a relative size of the protruded part to a size of the coil holding body can be increased and, as a result, a relative size of the flat part which is formed in the protruded part can be increased.

Therefore, according to the embodiment of the present invention, in a case that an operation object is to be attached to the coil holding body, the operation object whose relative size to the actuator is comparatively large can be attached to the coil holding body in a stable state by utilizing the flat part which can be formed larger. In other words, in the actuator in accordance with the embodiment of the present invention, an operation object whose relative size to the actuator is comparatively large can be held in a stable state. Further, in the embodiment of the present invention, in a case that the coil holding body (in other words, drive coil side) is to be attached to a host device on which the actuator is mounted, the drive coil can be attached to the host device in a stable state by utilizing the flat part which can be formed larger. In other words, in the embodiment of the present invention, it may be structured that one of a host device which holds the actuator and an operation object which is driven by the actuator is attached to the magnet holding body, and the other of the host device and the operation object is attached to the protruded part of the coil holding body.

Further, in the embodiment of the present invention, the protruded part is formed so as to extend over the tube part formed in a substantially tube shape and a flat part is formed in the protruded part. Therefore, in a case that an operation object is attached to the coil holding body, a gravity center position of the coil holding body and a gravity center position of the operation object can be brought close to each other when viewed in the first direction. Accordingly, in the embodiment of the present invention, in a case that an operation object is attached to the coil holding body, inclination of the coil holding body with respect to the magnet holding body can be suppressed. Further, in the embodiment of the present invention, the protruded part is formed so as to extend over the tube part formed in a substantially tube shape in the radial direction of the tube part and a flat part is formed in the protruded part. Therefore, when the coil holding body is attached to a host device, a gravity center position of the coil holding body and a gravity center position of the magnet holding body can be brought close to each other when viewed in the first direction. Accordingly, in the embodiment of the present invention, in a case that the coil holding body is attached to a host device, inclination of the magnet holding body with respect to the coil holding body can be suppressed.

In at least an embodiment of the present invention, the protruded part is formed with one of an engaging hook part protruding from the flat part to an outer side in the first direction, a male screw part protruding from the flat part to an outer side in the first direction, and a female screw part which is recessed from the flat part to an inner side in the first direction. In other words, it may be structured that one of a host device which holds the actuator and an operation object which is driven by the actuator is attached to one of the engaging hook part, the male screw part and the female screw part. According to this structure, when an operation object is to be attached to the coil holding body, the operation object can be attached to the coil holding body in a further stable state by utilizing the engaging hook part, the male screw part or the female screw part. Further, according to this structure, when the coil holding body is to be attached to a host device, the coil holding body can be attached to the host device in a further stable state by utilizing the engaging hook part, the male screw part or the female screw part.

In at least an embodiment of the present invention, the actuator includes a protruding member which is formed larger than the protruded part when viewed in the first direction and is fixed to the flat part, and a second flat part in a flat face shape which is perpendicular to the first direction is formed on a protruding side from the end face part of the protruding member. According to this structure, the size of the second flat part formed in the protruding member can be made larger than the size of the flat part of the protruded part. Therefore, in a case that an operation object is to be attached to the coil holding body, the operation object whose relative size to the actuator is comparatively large can be attached to the coil holding body in a further stable state by utilizing the second flat part which can be formed further larger. Further, in a case that the coil holding body (in other words, drive coil side) is to be attached to a host device, the drive coil can be attached to the host device in a further stable state by utilizing the second flat part which can be formed further larger.

In at least an embodiment of the present invention, the protruding member is formed with one of an engaging hook part protruding from the second flat part to an outer side in the first direction, a male screw part protruding from the second flat part to an outer side in the first direction, and a female screw part which is recessed from the second flat part to an inner side in the first direction. According to this structure, in a case that an operation object is to be attached to the coil holding body, the operation object can be attached to the coil holding body in a further stable state by utilizing the engaging hook part, the male screw part or the female screw part. Further, according to this structure, in a case that the coil holding body (in other words, drive coil side) is to be attached to a host device, the drive coil can be attached to the host device in a further stable state by utilizing the engaging hook part, the male screw part or the female screw part.

In at least an embodiment of the present invention, the actuator includes a plate spring which connects the coil holding body with the magnet holding body. The plate spring is provided with a coil side fixed part which is fixed to the coil holding body, a magnet side fixed part which is fixed to the magnet holding body, and an arm part which connects the coil side fixed part with the magnet side fixed part. The magnet holding body includes a first case which structures one of the two end face parts and a part of the side face part and a second case which structures the other of the two end face parts and a part of the side face part, and the magnet holding body is structured by assembling the first case and the second case in the first direction, and the magnet side fixed part is fixed between the first case and the second case in a sandwiched state by the first case and the second case. According to this structure, when an electric current is not supplied to the drive coil, one of the coil holding body and the magnet holding body can be stopped at a predetermined position (original position) with respect to the other of the coil holding body and the magnet holding body. Further, according to this structure, the magnet side fixed part is fixed between the first case and the second case which structure the side face part of the magnet holding body and thus a distance between the coil side fixed part and the magnet side fixed part can be increased widely and thereby a length of the arm part can be increased. Therefore, a relatively movable distance of the coil holding body with respect to the magnet holding body can be increased.

In at least an embodiment of the present invention, the drive magnet part includes a magnetic piece which is formed of soft magnetic material and is disposed between the two drive magnet pieces in the first direction so as to contact with the two drive magnet pieces, and a shaft which is inserted and fixed to through-holes penetrating through the two drive magnet pieces and the magnetic piece in the first direction. According to this structure, a density of magnetic flux passing through the drive coil which is disposed on an outer peripheral side with respect to the drive magnet part can be increased effectively. Further, in the embodiment of the present invention, the opposed faces of two drive magnet pieces are magnetized in the same magnetic pole as each other and thus a magnetic repulsive force is occurred between the two drive magnet pieces. However, according to this structure, jumping-out of the magnetic piece from between the two drive magnet pieces repelling each other can be prevented by the shaft.

In at least an embodiment of the present invention, a shaft insertion hole into which one end side of the shaft is inserted is formed in the end face part which is opposite to the end face part from which the protruded part of the coil holding body is protruded, and the one end side of the shaft is fixed to the shaft insertion hole. According to this structure, displacement in the radial direction of the drive magnet part with respect to the magnet holding body can be prevented.

In at least an embodiment of the present invention, the actuator includes a spacer which is formed of resin material in a substantially tube shape and is disposed between the drive coil and the side face part in the radial direction of the tube part, and the spacer is fixed to the magnet holding body. The coil holding body is formed with a flange part for preventing winding collapse of the drive coil on an outer side relative to the drive coil in the first direction so as to be enlarged relative to the drive coil to an outer side in the radial direction of the tube part, and a gap space between an outer peripheral end of the flange part and an inner peripheral face of the spacer in the radial direction of the tube part is set to be narrower than a gap space between an outer peripheral face of the drive magnet part and an inner peripheral face of the tube part in the radial direction of the tube part. According to this structure, for example, even when the actuator is used in a state that the first direction is coincided with the horizontal direction, the drive magnet part is prevented from contacting with the coil holding body. Therefore, damage of the drive magnet part is prevented. Further, according to this structure, in a case that the coil holding body is formed of resin material, for example, even when the actuator is used in a state that the first direction is coincided with the horizontal direction, one of the coil holding body and the magnet holding body is moved smoothly with respect to the other of the coil holding body and the magnet holding body in a state that the flange part of the coil holding body is contacted with the spacer.

In at least an embodiment of the present invention, the protruded part is formed with two terminal pins around which both end parts of the drive coil are respectively wound. According to this structure, processing of both end parts of the drive coil can be easily performed. Further, according to this structure, the terminal pins are formed in the protruded part which is protruded from one of the two end face parts to an outer side in the first direction and thus, when the actuator is to be attached to a host device, fixing work of the terminal pins to the host device can be easily performed. Specifically, the coil holding body is formed with a flange part for preventing winding collapse of the drive coil so as to be enlarged relative to the drive coil to an outer side in the radial direction of the tube part, the protruded part is provided with a plurality of column parts which are protruded from the flange part in the first direction so as to interpose the drive magnet part in the radial direction of the tube part and a connecting part which connects the plurality of the column parts in the radial direction of the tube part, and the flat part which is perpendicular to the first direction is formed by the connecting part and the terminal pins are formed so as to protrude from the flat part.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Embodiments in accordance with the present invention will be described below with reference to the accompanying drawings.

(Structure of Actuator)

Figure 1:
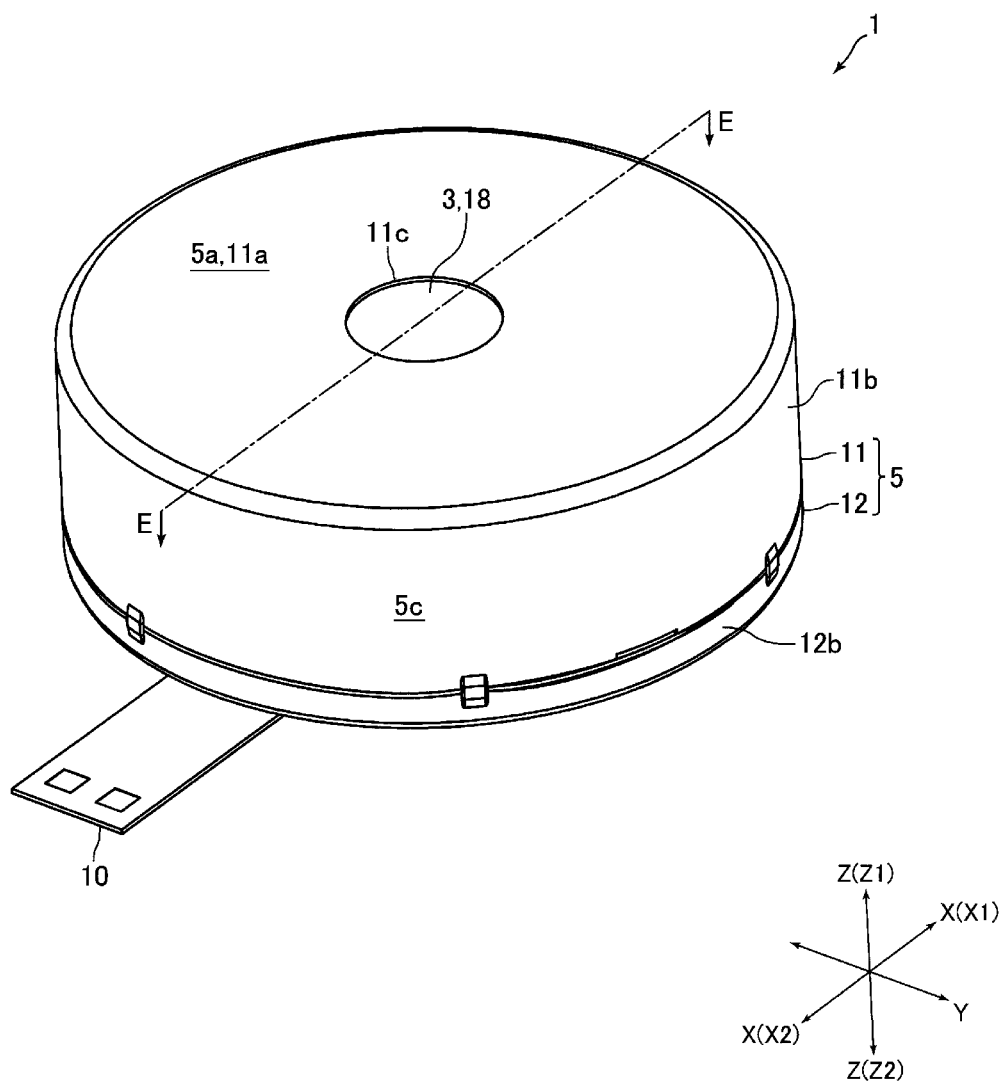
FIG. 1 is a perspective view showing an actuator in accordance with an embodiment of the present invention.
Figure 2:
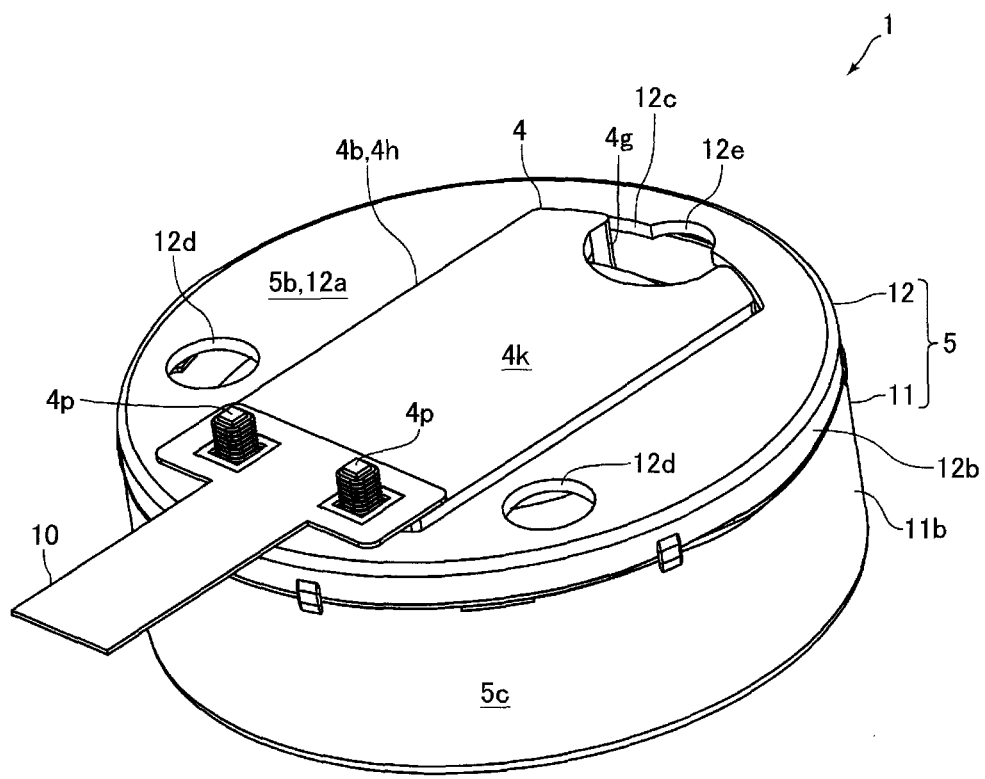
FIG. 2 is a perspective view showing an actuator in FIG. 1 which is viewed from an opposite side.
Figure 2:
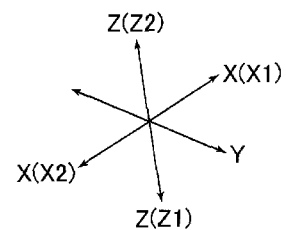
Figure 3:
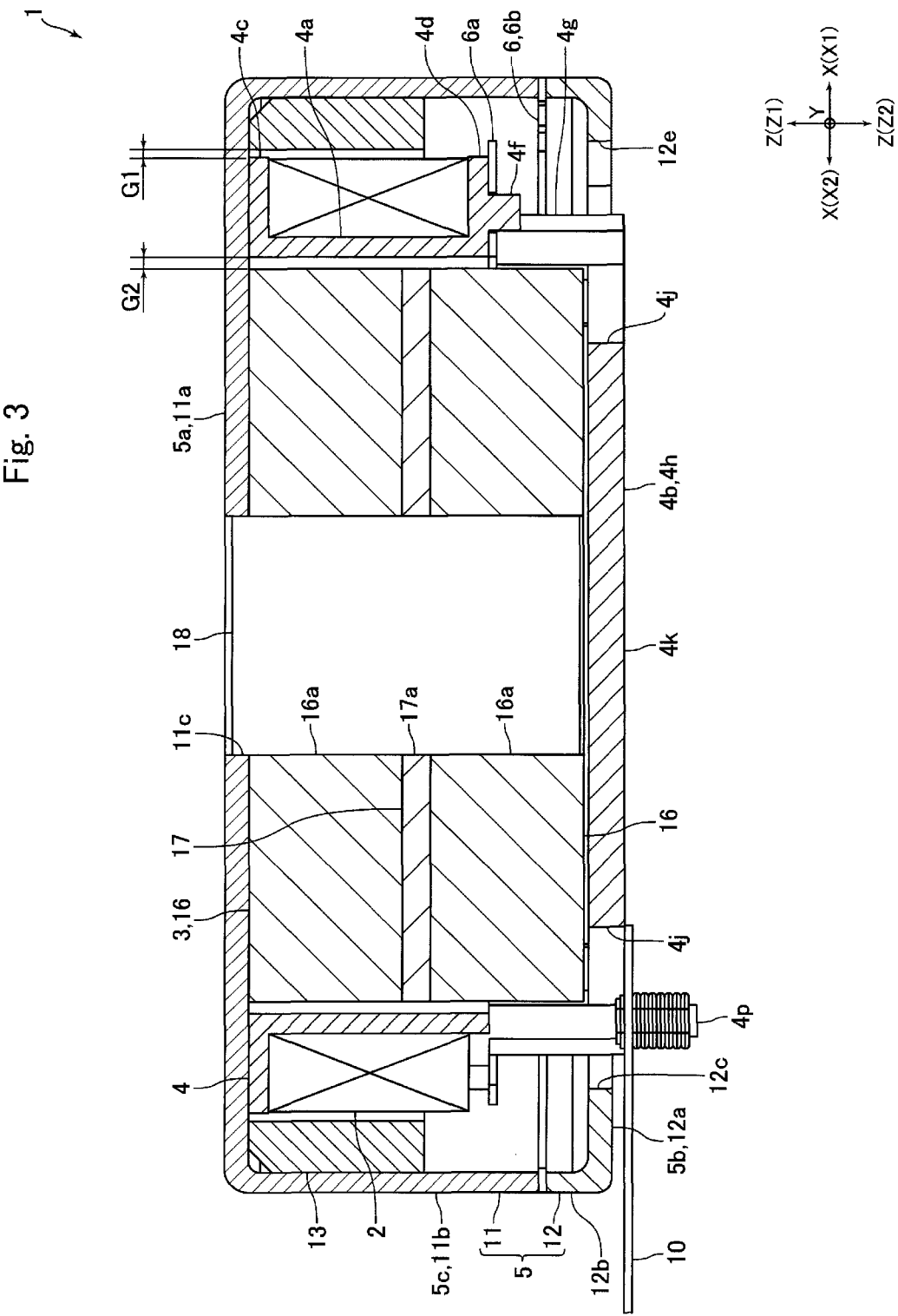
FIG. 3 is a cross-sectional view showing the "E-E" cross section of an actuator shown in FIG. 1.
Figure 4:
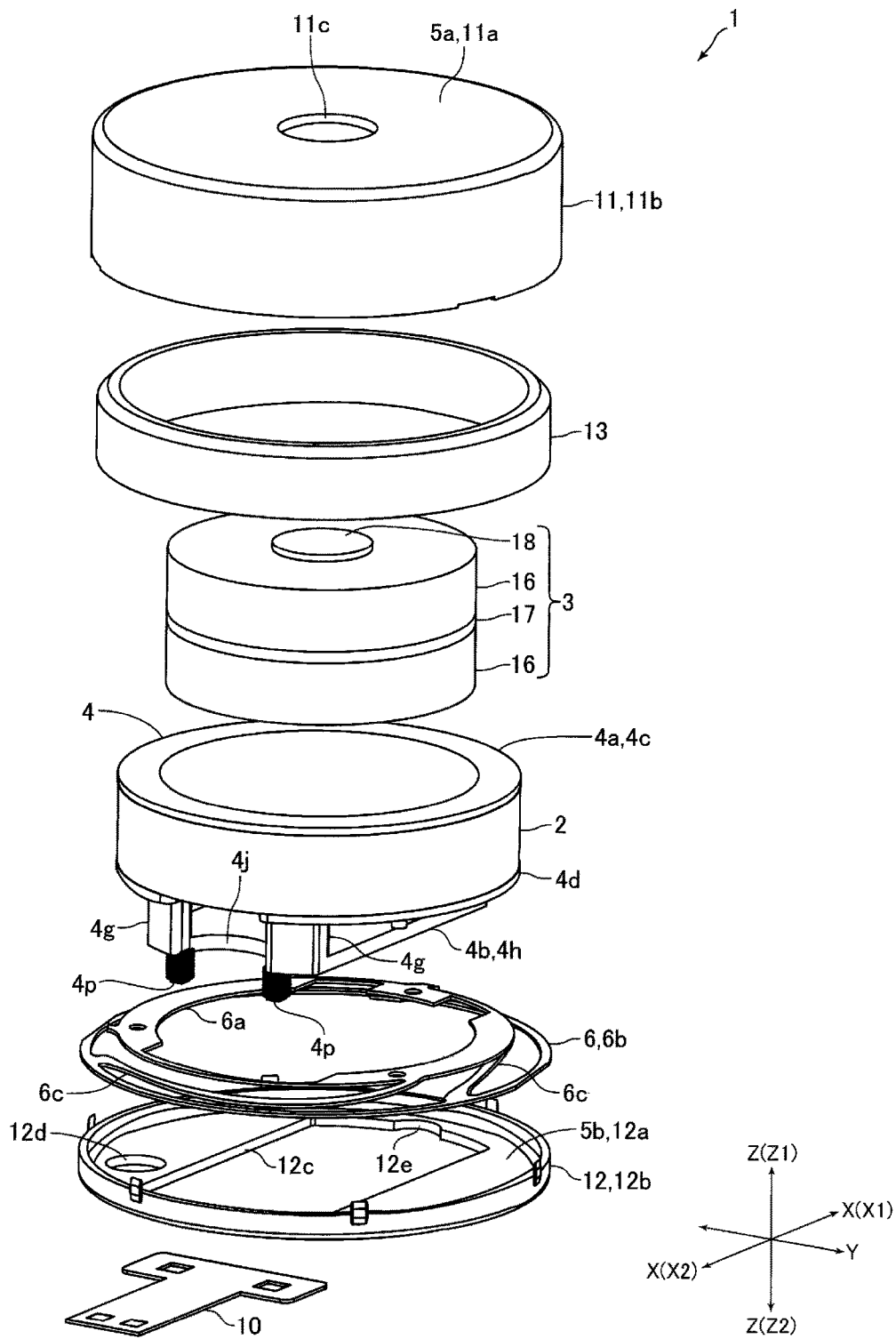
FIG. 4 is an exploded perspective view showing an actuator in FIG. 1.
Figure 5:
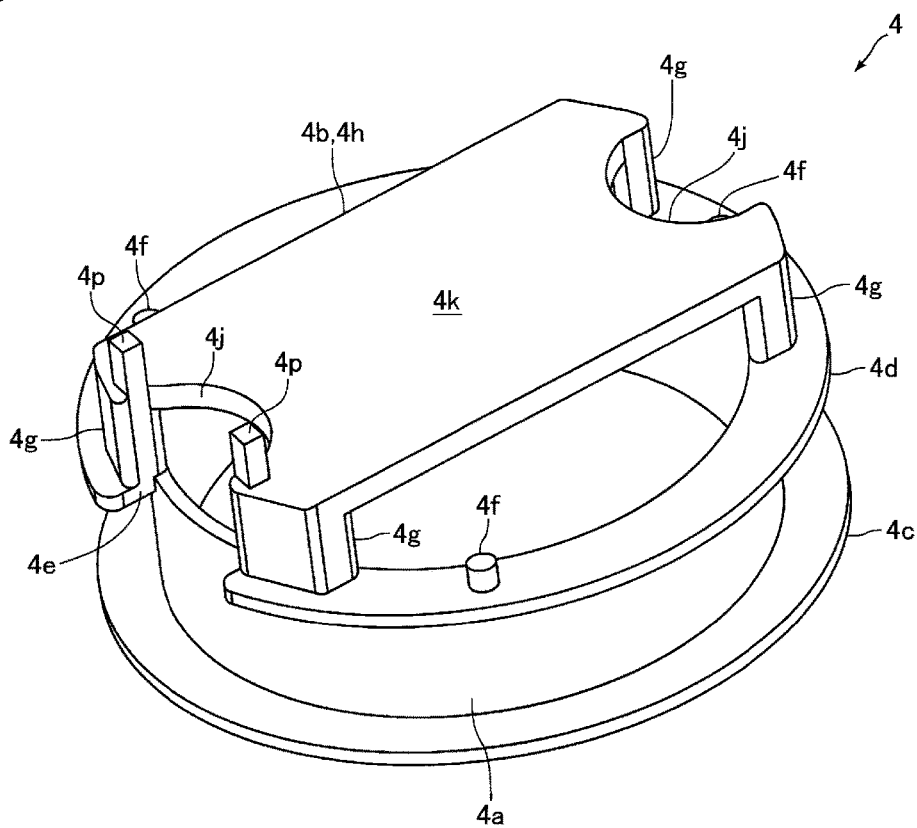
FIG. 5 is a perspective view showing a coil holding body shown in FIG. 4 which is viewed from an opposite side.
Figure 5:
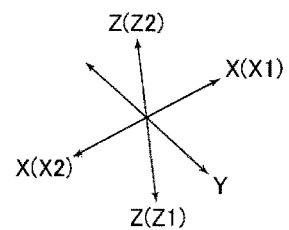

FIG. 1 is a perspective view showing an actuator 1 in accordance with an embodiment of the present invention. FIG. 2 is a perspective view showing the actuator 1 in FIG. 1 which is viewed from an opposite side. FIG. 3 is a cross-sectional view showing the "E-E" cross section of the actuator 1 shown in FIG. 1. FIG. 4 is an exploded perspective view showing the actuator 1 in FIG. 1. FIG. 5 is a perspective view showing a coil holding body 4 shown in FIG. 4 which is viewed from an opposite side.

An actuator 1 in this embodiment is an actuator for linearly moving a predetermined operation object (not shown) which is required to move linearly in a predetermined direction. Further, the actuator 1 is mounted for use on a predetermined host device (not shown). The actuator 1 is formed in a flat and substantially cylindrical shape as a whole. Further, the actuator 1 is small and, for example, an outer diameter of the actuator 1 is about 10 mm-30 mm, and a thickness of the actuator 1 is about 5 mm-10 mm.

The actuator 1 includes a drive coil 2 and a drive magnet part 3, a coil holding body 4 which holds the drive coil 2, a magnet holding body 5 which hold the drive magnet part 3, and a plate spring 6 which connects the coil holding body 4 with the magnet holding body 5. The coil holding body 4 is capable of moving linearly and relatively to the magnet holding body 5. In other words, the coil holding body 4 and the magnet holding body 5 are connected with each other so as to be relatively movable to each other through the plate spring 6. In this embodiment, a drive mechanism for relatively moving the coil holding body 4 with respect to the magnet holding body 5 is structured of the drive coil 2, the drive magnet part 3 and the like. Therefore, it may be structured that the magnet holding body 5 is held by a host device and an operation object which is attached to the coil holding body 4 is moved linearly and, alternatively, it may be structured that the coil holding body 4 is held by a host device and an operation object which is attached to the magnet holding body 5 is moved linearly.

In the following descriptions, as shown in FIG. 1 and the like, respective three directions perpendicular to each other are referred to as an "X" direction, a "Y" direction and a "Z" direction, and the "X" direction is referred to as a "right and left direction", the "Y" direction is a "front and rear direction" and the "Z" direction is an "upper and lower direction". Further, an "X1" direction side is referred to as a "right" side, an "X2" direction side is a "left" side, a "Z1" direction side is an "upper" side, and a "Z2" direction side is a "lower" side. In this embodiment, the coil holding body 4 is relatively movable to the magnet holding body 5 in the upper and lower direction ("Z" direction). In other words, in this embodiment, the upper and lower direction is a first direction which is a relatively moving direction of the coil holding body 4 with respect to the magnet holding body 5. Further, a direction perpendicular to the upper and lower direction is coincided with a radial direction of the actuator 1 which is formed in a flat and substantially cylindrical shape.

The coil holding body 4 is formed of resin material. The coil holding body 4 is provided with a substantially cylindrical tube part 4a whose inner peripheral side is penetrated in the upper and lower direction and a protruding part 4b which is protruded to a lower direction from a lower end face of the tube part 4a. The tube part 4a in this embodiment is formed in a flat and substantially cylindrical tube shape. A radial direction of the tube part 4a formed in a substantially cylindrical tube shape and a radial direction of the actuator 1 (in other words, a direction perpendicular to the upper and lower direction) are coincided with each other. In the following descriptions, this direction is referred to as a "radial direction".

The drive coil 2 is wound around on an outer peripheral side of the tube part 4a. The drive coil 2 is wound around an outer peripheral face of the tube part 4a and is wound in a substantially cylindrical tube shape. An upper end of the tube part 4a is formed with a flange part 4c enlarged to an outer side in the radial direction and a lower end of the tube part 4a is formed with a flange part 4d enlarged to an outer side in the radial direction. In other words, the flange parts 4c and 4d are formed on both outer sides of the drive coil 2 in the upper and lower direction. The flange parts 4c and 4d function as preventing winding collapse of the drive coil 2.

The flange part 4c is formed in a circular ring shape. The flange part 4d is formed in a roughly circular ring shape whose left end side is provided with a cut-out part 4e. An outer diameter of the flange part 4c and an outer diameter of the flange part 4d are set to be equal to each other. Further, the flange parts 4c and 4d are formed so as to be enlarged to an outer side in the radial direction relative to the drive coil 2. Specifically, the outer diameters of the flange parts 4c and 4d are, as shown in FIG. 3, set to be slightly larger than the outer diameter of the drive coil 2. In a state before a coil side fixed part 6a described below structuring the plate spring 6 is attached to the flange part 4d, three projecting parts 4f are formed on an under face of the flange part 4d so that the coil side fixed part 6a is welded and fixed (see FIG. 5). The projecting part 4f is formed so as to protrude from the under face of the flange part 4d to a lower side. Three projecting parts 4f are formed at a substantially equal interval in a circumferential direction of the flange part 4d.

The protruded part 4b is formed so as to extend in the radial direction over the tube part 4a formed in a substantially cylindrical tube shape. Specifically, as shown in FIG. 5, the protruded part 4b is formed so as to be extended over the tube part 4a formed in a substantially tube shape in the right and left direction, in other words, so as to stride the drive magnet part 3 described below from a right end side to a left end side of the tube part 4a. The protruded part 4b is provided with four column parts 4g protruding from the under face of the flange part 4d to a lower direction and a connecting part 4h through which lower ends of four column parts 4g are connected with each other.

Two of four column parts 4g are disposed on a right end side of the flange part 4d. The two column parts 4g are disposed with a predetermined space therebetween in a circumferential direction of the flange part 4d. One of three projecting parts 4f is formed between these two column parts 4g in the circumferential direction of the flange part 4d. Remaining two column parts 4g of four column parts 4g are disposed on a left end side of the flange part 4d. The two column parts 4g are disposed with a predetermined space therebetween in a circumferential direction of the flange part 4d. The cut-out part 4e is formed between the two column parts 4g in the circumferential direction of the flange part 4d.

As described above, four column parts 4g are formed so that the drive magnet part 3 described below which is disposed on an inner peripheral side of the tube part 4a is interposed between two column parts 4g disposed on the right end side of the flange part 4d and two column parts 4g disposed on the left end side of the flange part 4d when viewed in the upper and lower direction. Therefore, the connecting part 4h which is structured by connecting lower ends of four column parts 4g with each other faces a shaft 18 and a center side portion of a drive magnet piece 16 described below which structure the drive magnet part 3. Further, four column parts 4g are formed on an inner side portion in the radial direction of the under face of the flange part 4d. When viewed in the upper and lower direction, an outer side face of the column part 4g in the radial direction is disposed on an inner side relative to an outer edge of the flange part 4d. Further, when viewed in the upper and lower direction, an inner side face of the column part 4g in the radial direction is coincided with an inner peripheral face of the tube part 4a.

The connecting part 4h is formed in a flat plate shape which is perpendicular to the upper and lower direction. Further, the connecting part 4h is formed in a roughly rectangular shape. Both end faces on the front and rear sides of the connecting part 4h are perpendicular to the front and rear direction. Both right and left end sides of the connecting part 4h are formed with a cut-out part 4j in a substantially semicircular shape which is recessed to an inner side in the right and left direction. The cut-out part 4j is formed at a center position in the front and rear direction. Lower ends of the column parts 4g are connected with both side portions in the front and rear direction of the cut-out part 4j. When viewed in the upper and lower direction, both end faces in the right and left direction of the connecting part 4h in both side portions in the front and rear direction with respect to the cut-out part 4j are coincided with the outer side faces of the column parts 4g in the radial direction. An under face of the connecting part 4h (in other words, the under face of the protruded part 4b) is formed in a flat part 4k in a flat face shape which is perpendicular to the upper and lower direction.

A left end side of the protruded part 4b is formed with two terminal pins 4p around which respective end parts of the drive coil 2 are wound. The terminal pin 4p is formed so as to protrude from the flat part 4k to a lower side. Further, two terminal pins 4p are formed on both sides in the front and rear direction of the cut-out part 4j which is disposed on the left side. Both end sides of the drive coil 2 which is wound around the tube part 4a are led out to the terminal pins 4p by utilizing the cut-out part 4e. A flexible printed circuit board 10 is connected with the terminal pins 4p.

The magnet holding body 5 is provided with an end face part 5a which structures an upper end face of the magnet holding body 5, an end face part 5b which structures a lower end face of the magnet holding body 5, and a side face part 5c which structures an outer peripheral face in a radial direction of the magnet holding body 5. In this embodiment, the end face parts 5a and 5b are formed in a substantially circular plate shape and the side face part 5c is formed in a substantially cylindrical tube shape and thus the magnet holding body 5 is formed in a substantially bottomed cylindrical tube shape having an upper end face and a lower end face. The end face parts 5a and 5b structure both end faces on an upper side and a lower side of the actuator 1 and the side face part 5c structures an outer peripheral face in the radial direction of the actuator 1. The magnet holding body 5 covers the entire coil holding body 4 except a part on a lower end side of the protruded part 4b, the drive coil 2 and the drive magnet part 3. In other words, the end face parts 5a and 5b are disposed on the outer side relative to the drive coil 2 and the drive magnet part 3 in the upper and lower direction and the side face part 5c is disposed so as to surround the outer peripheral side of the drive coil 2 and the drive magnet part 3.

Further, the magnet holding body 5 is structured of a case 11 as a second case, which structures the end face part 5a and a part of the side face part 5c, and a case 12 as a first case which structures the end face part 5b and a part of the side face part 5c. The cases 11 and 12 are formed of soft magnetic material. Further, the cases 11 and 12 are formed in a substantially bottomed cylindrical tube shape, and the case 11 and the case 12 are assembled each other in the upper and lower direction into the magnet holding body 5.

The case 11 is structured of an end face part 11a which structures the end face part 5a and a side face part 11b which structures an upper end side portion of the side face part 5c. The end face part 11a is formed in a substantially circular plate shape and the side face part 11b is formed in a substantially cylindrical tube shape. The end face part 11a is formed with a shaft insertion hole 11c into which an upper end side of a shaft 18 described below which structures the drive magnet part 3 is inserted. The shaft insertion hole 11c is formed at a center of the end face part 11a. Further, the shaft insertion hole 11c is formed in a round hole shape which penetrates through the end face part 11a in the upper and lower direction.

An inner peripheral face of the case 11 is fixed with a spacer 13 which is formed of resin material for preventing the coil holding body 4 from contacting with the drive magnet part 3 when the coil holding body 4 is relatively moved with respect to the drive magnet part 3. The spacer 13 is formed in a substantially tube shape. Specifically, the spacer 13 is formed in a substantially cylindrical tube shape. An outer diameter of the spacer 13 is substantially equal to an inner diameter of the side face part 11b. An inner diameter of the spacer 13 is set to be larger than the outer diameters of the flange parts 4c and 4d of the coil holding body 4. The spacer 13 is disposed on an inner peripheral side of the case 11 in a state that its upper end face and an under face of the end face part 11a are abutted with each other. In other words, the spacer 13 is fixed to the side face part 11b.

The case 12 is structured of an end face part 12a which structures the end face part 5b and a side face part 12b which structures a lower end side portion of the side face part 5c. The end face part 12a is formed in a substantially circular plate shape and the side face part 12b is formed in a substantially cylindrical tube shape. An outer diameter of the end face part 12a is set to be equal to an outer diameter of the end face part 11a. Each of an inner diameter and an outer diameter of the side face part 12b is equal to each of an inner diameter and an outer diameter of the side face part 11b. The end face part 12a is formed with an opening part 12c. The opening part 12c is formed so as to penetrate through the end face part 12a in the upper and lower direction. Further, the opening part 12c is formed from a right end side of the end face part 12a to its left end side. Edges on the front side and the rear side of the opening part 12c are perpendicular to the front and rear direction. Edges on the right side and the left side of the opening part 12c are formed in a substantially circular arc shape.

A part of the protruded part 4b is disposed in the opening part 12c. Specifically, lower end side portions of the column parts 4g and an upper end side portion of the connecting part 4h are disposed in the opening part 12c, and a lower end side portion of the connecting part 4h is protruded to a lower side relative to the under face of the end face part 12a. In other words, the protruded part 4b is inserted into the opening part 12c, and a part of the lower end side of the protruded part 4b is protruded to a lower side relative to the end face part 12a. As described above, the under face of the connecting part 4h is formed in the flat part 4k having a flat face shape which is perpendicular to the upper and lower direction. In other words, the flat part 4k is formed on a lower side of the protruded part 4b which is a protruded side of the protruded part 4b.

Further, the end face part 12a is formed with through-holes 12d for preventing an interference between a welded portion of a coil side fixed part 6a described below which structures the plate spring 6 to the flange part 4d of the coil holding body 4, and the end face part 12a. A cut-out part 12e is also formed at an edge on a right side of the opening part 12c for preventing an interference between a welded portion of the coil side fixed part 6a to the flange part 4d and the end face part 12a.

As described above, the magnet holding body 5 is structured by assembling the case 11 and the case 12 together in the upper and lower direction. In other words, a lower end side of the side face part 11b of the case 11 and an upper end side of the side face part 12b of the case 12 are fixed to each other and thereby the magnet holding body 5 is structured. In this embodiment, the lower end side of the side face part 11b and the upper end side of the side face part 12b are welded and fixed to each other in a state that the magnet side fixed part 6b described below structuring the plate spring 6 is sandwiched between the lower end of the side face part 11b and the upper end of the side face part 12b and thereby the magnet holding body 5 is structured.

The drive magnet part 3 is formed in a flat and cylindrical shape and is disposed on an inner peripheral side relative to the tube part 4a of the coil holding body 4. In other words, the drive magnet part 3 is disposed on the inner peripheral side with respect to the drive coil 2, and the drive coil 2 is disposed so as to surround the entire periphery on the outer peripheral side of the drive magnet part 3. The drive magnet part 3 is structured of two drive magnet pieces 16 disposed so as to superpose in the upper and lower direction, a magnetic piece 17 formed of soft magnetic material, and a shaft 18 structuring a center portion of the drive magnet part 3.

The drive magnet pieces 16 and the magnetic piece 17 are formed in a flat plate shape. Further, the drive magnet pieces 16 and the magnetic piece 17 are formed in a circular ring shape. In other words, through-holes 16a and 17a penetrating in the upper and lower direction are formed at centers of the drive magnet pieces 16 and the magnetic piece 17. An inner diameter of the through-hole 16a and an inner diameter of the through-hole 17a are equal to each other. Further, an outer diameter of the drive magnet piece 16 and an outer diameter of the magnetic piece 17 are equal to each other.

The magnetic piece 17 is disposed between two drive magnet pieces 16 in the upper and lower direction. Further, the drive magnet piece 16 disposed on the upper side and the magnetic piece 17 are fixed to each other in a state that an under face of the drive magnet piece 16 disposed on the upper side and an upper face of the magnetic piece 17 are contacted with each other, and the drive magnet piece 16 disposed on a lower side and the magnetic piece 17 are fixed to each other in a state that an upper face of the drive magnet piece 16 disposed on a lower side and an under face of the magnetic piece 17 are contacted with each other. In other words, the magnetic piece 17 is fixed to two drive magnet pieces 16 in a contacted state with two drive magnet pieces 16.

The drive magnet piece 16 is magnetized so that a magnetic pole of its upper face and a magnetic pole of its under face are different from each other. Further, two drive magnet pieces 16 are disposed so that their opposing faces are the same magnetic pole as each other. In other words, the faces facing each other of the drive magnet pieces 16 are magnetized in the same magnetic pole. For example, an under face of the drive magnet piece 16 disposed on the upper side and an upper face of the drive magnet piece 16 disposed on the lower side are magnetized in an "N"-pole. Therefore, a magnetic field in which a direction of magnetic lines of force radially spreads is generated from a center portion in the upper and lower direction of the drive magnet part 3.

The shaft 18 is inserted and fixed to the through-holes 16a and 17a of the drive magnet pieces 16 and the magnetic piece 17. An upper end side of the shaft 18 is protruded to an upper side relative to an upper end face of the drive magnet piece 16 disposed on the upper side. The upper end side of the shaft 18 is inserted and fixed to the shaft insertion hole 11c which is formed in the end face part 11a of the case 11. For example, the upper end side of the shaft 18 is press-fitted and fixed to the shaft insertion hole 11c.

The drive magnet part 3 is disposed between the end face part 5a and the end face part 5b in the upper and lower direction. An upper end face of the drive magnet part 3 is contacted with an under face of the end face part 5a (in other words, an under face of the end face part 11a of the case 11) and is fixed to the under face of the end face part 5a. On the other hand, a slight gap space is formed between the lower end face of the drive magnet part 3 and an upper face of the end face part 5b (in other words, an upper face of the end face part 12a of the case 12).

In this embodiment, the drive magnet part 3 and the drive coil 2 are formed and disposed so that a lower end of the drive coil 2 is not moved to an upper side relative to the upper end of the drive magnet piece 16 disposed on the lower side, and so that an upper end of the drive coil 2 is not moved to a lower side relative to the lower end of the drive magnet piece 16 disposed on the upper side. As described above, the opposed faces of the drive magnet pieces 16 are magnetized in the same magnetic pole as each other and thus a magnetic field passing the drive coil 2 is generated from the drive magnet part 3.

The plate spring 6 is provided with a coil side fixed part 6a which is fixed to the coil holding body 4, a magnet side fixed part 6b which is fixed to the magnet holding body 5, and a plurality of arm parts 6c which connect the coil side fixed part 6a with the magnet side fixed part 6b. The plate spring 6 in this embodiment is provided with three arm parts 6c. The coil side fixed part 6a and the magnet side fixed part 6b are formed in a substantially circular ring shape. The coil side fixed part 6a is disposed on an inner side in the radial direction relative to the magnet side fixed part 6b. The arm part 6c is formed in a substantially circular arc shape and is disposed between the coil side fixed part 6a and the magnet side fixed part 6b in the radial direction.

The coil side fixed part 6a is fixed to an under face of the flange part 4d. In this embodiment, the coil side fixed part 6a is fixed to the under face of the flange part 4d by welding of three projecting parts 4f. The magnet side fixed part 6b is fixed between the lower end of the side face part 11b and the upper end of the side face part 12b in a state that the magnet side fixed part 6b is sandwiched between the lower end of the side face part 11b of the case 11 and the upper end of the side face part 12b of the case 12. In this embodiment, the coil side fixed part 6a and the magnet side fixed part 6b are fixed in a state that the arm parts 6c are resiliently bent so that, when an electric current is not supplied to the drive coil 2, an upper end face of the coil holding body 4 is abutted with the end face part 5a of the magnet holding body 5 (in other words, the coil holding body 4 is urged to an upper side with respect to the magnet holding body 5). In other words, in this embodiment, the plate spring 6 holds the coil holding body 4 at an original position where the coil holding body 4 is abutted with the magnet holding body 5 when an electric current is not supplied to the drive coil 2. In this embodiment, when an electric current is not supplied to the drive coil 2, an upper end face of the coil holding body 4 is abutted with the end face part 5a of the magnet holding body 5. However, it may be structured that an upper end face of the coil holding body 4 is separated from the end face part 5a of the magnet holding body 5 (the coil holding body 4 is floated with respect to the magnet holding body 5).

As described above, the spacer 13 is fixed to an inner peripheral side of the case 11. The spacer 13 is, as shown in FIG. 3, disposed between the tube part 4a of the coil holding body 4 and the drive coil 2 and the side face part 11b of the case 11 in the radial direction. Further, as described above, the drive magnet part 3 is disposed on an inner peripheral side of the tube part 4a of the coil holding body 4. In this embodiment, a gap space "G1" (see FIG. 3) in the radial direction between the outer peripheral ends of the flange parts 4c and 4d and the inner peripheral face of the spacer 13 is set to be smaller than a gap space "G2" (see FIG. 3) in the radial direction between the outer peripheral face of the drive magnet part 3 and the tube part 4a. Therefore, even when the coil holding body 4 is inclined, the outer peripheral ends of the flange parts 4c and 4d are contacted with the inner peripheral face of the spacer 13 before the outer peripheral face of the drive magnet part 3 is contacted with the tube part 4a and thereby contacting of the coil holding body 4 with the drive magnet part 3 is prevented.

In the actuator 1, for example, an operation object to be operated is attached to the coil holding body 4 and the magnet holding body 5 is attached to a host device. In this case, an operation object is attached to the flat part 4k of the protruded part 4b. Specifically, an operation object is fixed to the flat part 4k by adhesion. Alternatively, the coil holding body 4 is attached to a host device and an operation object is attached to the magnet holding body 5. In this case, the flat part 4k is attached to the host device. Specifically, the flat part 4k is fixed to the host device by adhesion.

Further, in the actuator 1, when an electric current flowing in a predetermined direction is supplied to the drive coil 2, the coil holding body 4 is relatively moved to a lower direction with respect to the magnet holding body 5 and, when an electric current flowing in a reverse direction is supplied to the drive coil 2, the coil holding body 4 is relatively moved to an upper direction with respect to the magnet holding body 5. Further, when an electric current is not supplied to the drive coil 2, the coil holding body 4 is stopped with respect to the magnet holding body 5 in a state that the upper end face of the coil holding body 4 is abutted with the end face part 5a of the magnet holding body 5 by an urging force of the plate spring 6. In accordance with an embodiment of the present invention, when supplying of an electric current flowing in a predetermined direction is stopped, it may be structured that the coil holding body 4 is returned to the original position where the coil holding body 4 is abutted with the magnet holding body 5 by an urging force of the plate spring 6 and, alternatively, it may be structured that the coil holding body 4 is returned to the original position by supplying an electric current in a reverse direction. Further, in this actuator 1, when an electric current flowing in a predetermined direction and an electric current flowing in a reverse direction are alternately supplied, the coil holding body 4 are continuously and relatively moved with respect to the magnet holding body 5 in the upper and the lower directions. In a case that such a successive up-and-down motion is performed, a position where the upper end face of coil holding body 4 is abutted with the end face part 5a of the magnet holding body 5 is not required as an original position and, when an electric current is not supplied to the drive coil 2, the upper end face of the coil holding body 4 may be separated from the end face part 5a of the magnet holding body 5.

Principal Effects in this Embodiment

As described above, in this embodiment, the coil holding body 4 is formed with the protruded part 4b which is protruded to the lower side relative to the end face part 5b structuring the lower end face of the magnet holding body 5. Further, in this embodiment, the protruded part 4b is formed in the tube part 4a which is formed in a substantially tube shape so as to be extended in the right and left direction and the under face of the protruded part 4b is formed to be the flat part 4k having a flat face shape which is perpendicular to the upper and lower direction. In other words, the protruded part 4b is formed from a right end side (one end side) of the tube part 4a to its left end side (the other end) so as to stride over the drive magnet part 3 and thus a large area of the flat part 4k are secured. Therefore, in this embodiment, the protruded part 4b is formed in the tube part 4a which is formed in a substantially tube shape so as to be extended over in the right and left direction and thus a relative size of the protruded part 4b to a size of the coil holding body 4 can be increased. As a result, a relative size of the flat part 4k can be increased.

Therefore, according to this embodiment, even when an operation object is to be attached to the coil holding body 4 and a relative size of the operation object attached to the coil holding body 4 is comparatively large relative to the actuator 1, a large operation object can be attached to the coil holding body 4 in a stable state by utilizing the flat part 4k which is formed to be large. In other words, in the actuator 1 in accordance with this embodiment, an operation object whose relative size to the actuator 1 is comparatively large can be held in a stable state. Further, according to this embodiment, when the coil holding body 4 is to be attached to a host device, the coil holding body 4 can be attached to the host device in a stable state by utilizing the flat part 4k which can be formed to be large.

Further, in this embodiment, the flat part 4k is formed in the protruded part 4b which is extended over the tube part 4a in the right and left direction and thus, when an operation object is attached to the coil holding body 4, a gravity center position of the coil holding body 4 and a gravity center position of an operation object can be brought close to each other when viewed in the upper and lower direction. Therefore, according to this embodiment, when an operation object is attached to the coil holding body 4, inclination of the coil holding body 4 with respect to the magnet holding body 5 can be suppressed. Further, in this embodiment, the flat part 4k is formed in the protruded part 4b which is extended over the tube part 4a in the right and left direction and thus, when the coil holding body 4 is attached to a host device, a gravity center position of the coil holding body 4 and a gravity center position of the magnet holding body 5 can be brought close to each other when viewed in the upper and lower direction. Therefore, according to this embodiment, when the coil holding body 4 is attached to a host device, inclination of the magnet holding body 5 with respect to the coil holding body 4 can be suppressed.

In this embodiment, the coil holding body 4 and the magnet holding body 5 are connected with each other through the plate spring 6. Therefore, according to this embodiment, as described above, when an electric current is not supplied to the drive coil 2, the coil holding body 4 can be stopped with respect to the magnet holding body 5 in a state that the upper end face of the coil holding body 4 is abutted with the end face part 5a of the magnet holding body 5 by an urging force of the plate spring 6. Specifically, when an electric current is not supplied to the drive coil 2, the upper end face of the coil holding body 4 is abutted with the end face part 5a of the magnet holding body 5 and, when an electric current is supplied to the drive coil 2, the coil holding body 4 is relatively moved to a lower direction against the urging force of the plate spring 6. Further, when supplying of the electric current to the drive coil 2 is stopped, in a case that the coil holding body 4 is hard to be returned to the original position only by the urging force of the plate spring 6, an electric current flowing in a reverse direction may be supplied to the drive coil 2. According to this structure, the coil holding body 4 can be smoothly returned to the original position and is held by the urging force of the plate spring 6. Further, in this embodiment, the magnet side fixed part 6b of the plate spring 6 is fixed between the side face part 11b of the case 11 and the side face part 12b of the case 12 which structure the outer peripheral face of the actuator 1 and thus a distance between the coil side fixed part 6a and the magnet side fixed part 6b is broadly increased and thereby a length of the arm part 6c can be increased. Therefore, according to this embodiment, a relatively movable distance of the coil holding body 4 with respect to the magnet holding body 5 can be increased.

In this embodiment, the magnetic piece 17 is fixed to the two drive magnet pieces 16 in a contacted state with the two drive magnet pieces 16. Therefore, according to this embodiment, a density of magnetic flux passing through the drive coil 2 can be increased effectively. Further, in the drive magnet part 3 in accordance with this embodiment, the opposed faces of the two drive magnet pieces 16 are magnetized in the same magnetic pole as each other and thus a magnetic repulsive force is occurred between the two drive magnet pieces 16. However, in this embodiment, the shaft 18 is inserted and fixed to the through-holes 16a and 17a penetrating through the drive magnet pieces 16 and the magnetic piece 17 and thus jumping-out of the magnetic piece 17 from between the two drive magnet pieces 16 repelling each other can be prevented by the shaft 18.

In this embodiment, the end face part 5a structuring the upper end face of the magnet holding body 5 is formed with the shaft insertion hole 11c into which one end side of the shaft 18 is inserted and the upper end side of the shaft 18 is fixed to the shaft insertion hole 11c. Therefore, in this embodiment, displacement in the radial direction of the drive magnet part 3 with respect to the magnet holding body 5 is prevented.

In this embodiment, as shown in FIG. 3, the gap space "G1" in the radial direction between the outer peripheral ends of the flange parts 4c and 4d of the coil holding body 4 and the inner peripheral face of the spacer 13 is set to be smaller than the gap space "G2" in the radial direction between the outer peripheral face of the drive magnet part 3 and the tube part 4a of the coil holding body 4. Therefore, in this embodiment, for example, even when the actuator 1 is used in a state that the "Z" direction is coincided with the horizontal direction and thereby gravity is acted on the coil holding body 4, the drive magnet part 3 is prevented from contacting with the coil holding body 4. Therefore, damage of the drive magnet part 3 is prevented. Further, in this embodiment, the coil holding body 4 is formed of resin material. Therefore, for example, even when the actuator 1 is used in a state that the "Z" direction is coincided with the horizontal direction, the coil holding body 4 is relatively moved smoothly with respect to the magnet holding body 5 in a state that the flange parts 4c and 4d are contacted with the spacer 13.

In this embodiment, the protruded part 4b is formed with two terminal pins 4p around which both end parts of the drive coil 2 are respectively wound. Therefore, in this embodiment, processing of both end parts of the drive coil 2 can be easily performed. Further, in this embodiment, the terminal pins 4p are formed in the protruded part 4b which is protruded to a lower side from the end face part 5b of the magnet holding body 5. Therefore, when the actuator 1 is to be attached to a host device, fixing work of the terminal pins 4p to the host device can be easily performed.

Other Embodiments

Although the present invention has been shown and described with reference to a specific embodiment, various changes and modifications will be apparent to those skilled in the art from the teachings herein.

Figure 6:
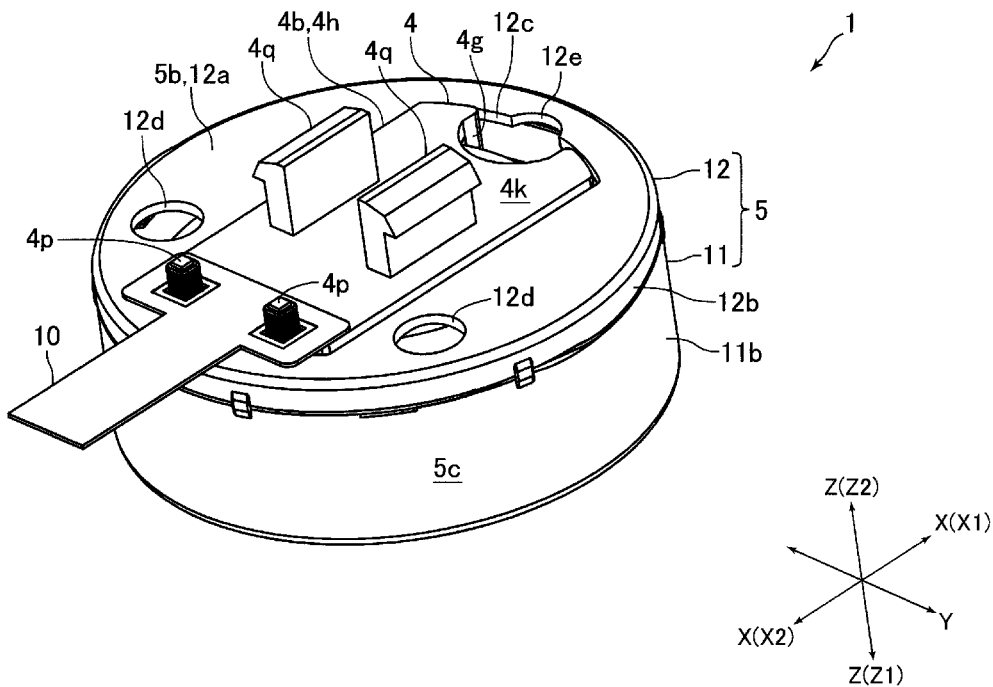
FIG. 6 is a perspective view showing an actuator in accordance with another embodiment of the present invention.

In the embodiment described above, as shown in FIG. 6, it may be structured that the protruded part 4b is formed with two engaging hook parts 4q which are protruded from the flat part 4k to a lower side. In the embodiment shown in FIG. 6, two engaging hook parts 4q are formed in a separated state from each other with a predetermined space therebetween in the front and rear direction and the engaging hook parts 4q are capable of being elastically deformed to inner sides in the front and rear direction. According to this structure, when an operation object is to be attached to the coil holding body 4, the operation object can be attached to the coil holding body 4 in a further stable state by utilizing the engaging hook parts 4q. Further, according to this structure, when the coil holding body 4 is to be attached to a host device, the coil holding body 4 can be attached to the host device in a further stable state by utilizing the engaging hook parts 4q. In FIG. 6, the same reference signs are used for the same structure as the embodiment described above.

In the embodiment described above, as shown in FIG. 7, a protruding member 24 which is formed larger than the protruded part 4b when viewed in the upper and lower direction may be fixed to the flat part 4k. In the embodiment shown in FIG. 7, the protruding member 24 is formed in a substantially circular plate shape which is perpendicular to the upper and lower direction. A left end side of the protruding member 24 is formed with a cut-out part 24a where a part of the flexible printed circuit board 10 and the terminal pins 4p are disposed. Further, an outer diameter of the protruding member 24 is set to be larger than an outer diameter of the magnet holding body 5. An under face of the protruding member 24 is a second flat part 24b formed in a flat face shape which is perpendicular to the upper and lower direction.

Figure 7:
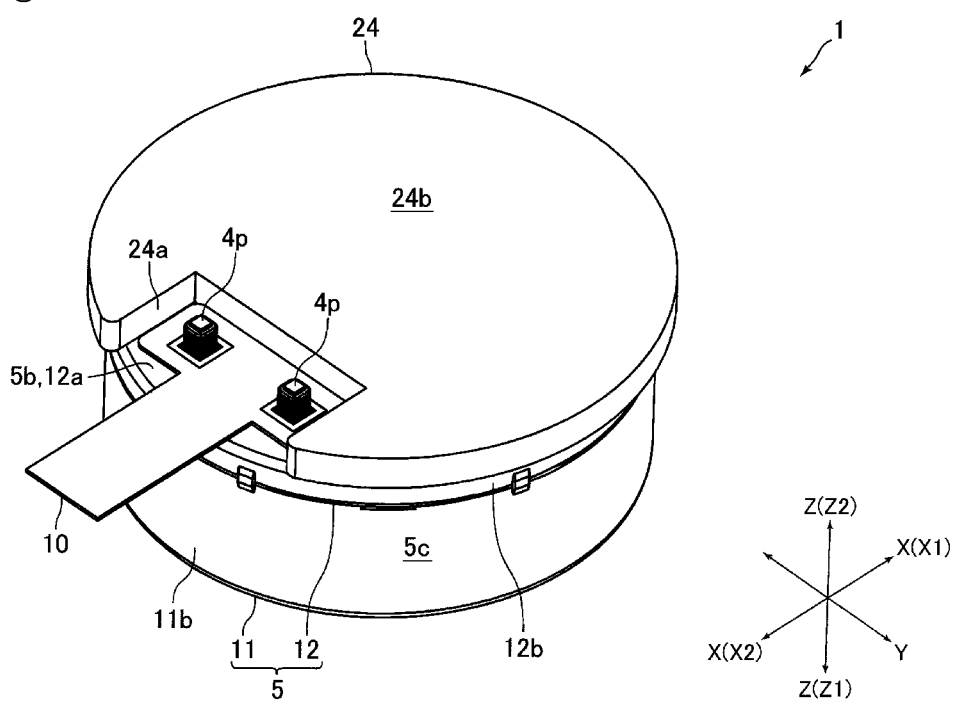
FIG. 7 is a perspective view showing an actuator in accordance with another embodiment of the present invention.

In this case, the size of the second flat part 24b can be set larger than the size of the flat part 4k. Therefore, in a case that an operation object is to be attached to the coil holding body 4, an operation object whose relative size to the actuator 1 is comparatively large can be attached to the coil holding body 4 in a further stable state by utilizing the second flat part 24b which can be formed to be further larger. Further, in a case that the coil holding body 4 is to be attached to a host device, the coil holding body 4 can be attached to the host device in a further stable state by utilizing the second flat part 24b which can be formed to be further larger. In FIG. 7, the same reference signs are used for the same structure as the embodiment described above.

Figure 8:
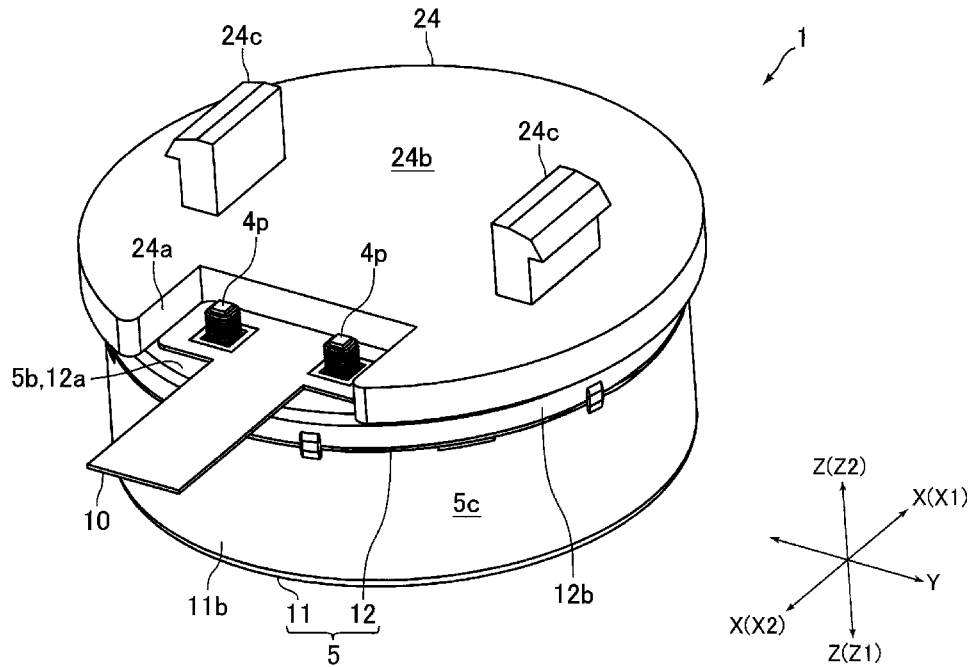
FIG. 8 is a perspective view showing an actuator in accordance with another embodiment of the present invention.
Figure 9:
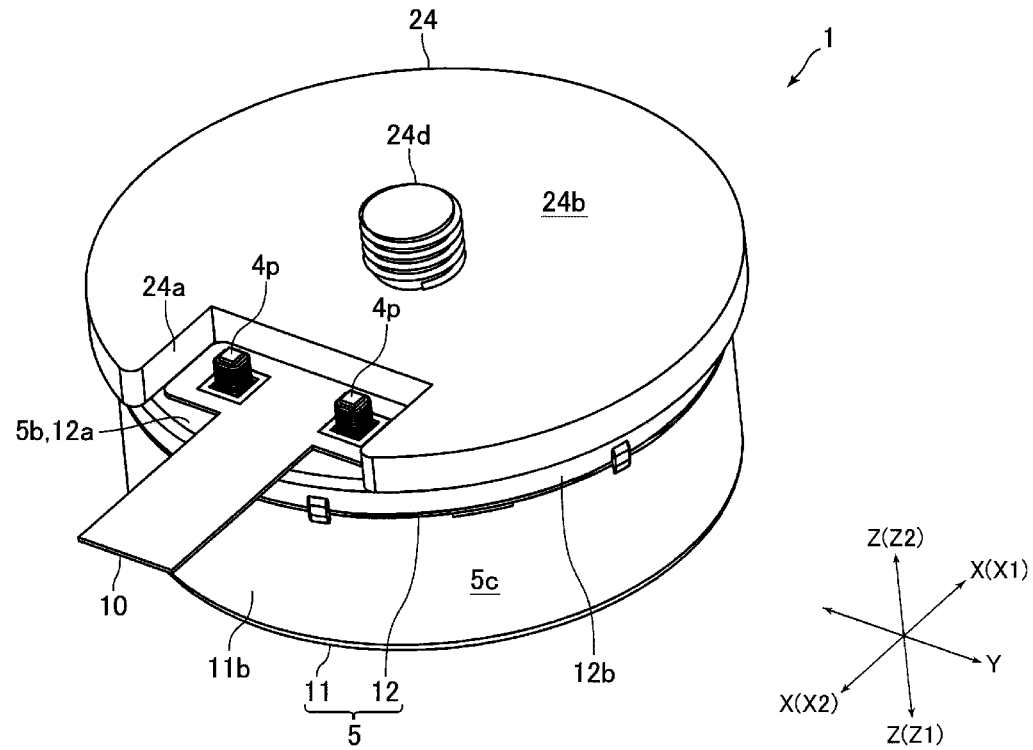
FIG. 9 is a perspective view showing an actuator in accordance with another embodiment of the present invention.

In the embodiment shown in FIG. 7, as shown in FIG. 8, two engaging hook parts 24c which are protruded from the second flat part 24b to a lower side may be formed in the protruding member 24. In the embodiment shown in FIG. 8, similarly to the embodiment shown in FIG. 6, two engaging hook parts 24c are formed in a separated state from each other with a predetermined space therebetween in the front and rear direction and the engaging hook parts 24c are capable of being elastically deformed to inner sides in the front and rear direction. Further, in the embodiment shown in FIG. 7, as shown in FIG. 9, the protruding member 24 may be formed with a male screw part 24d which is protruded from the second flat part 24b to a lower side. In other words, a male screw part 24d which is a projection whose outer peripheral face is formed with a screw may be formed in the protruding member 24. The male screw part 24d is, for example, formed at a center of the protruding member 24. Further, in the embodiment shown in FIG. 7, the protruding member 24 may be formed with a female screw part which is recessed from the second flat part 24b to a lower side. In other words, a circular recessed part whose inner peripheral face is formed with a screw may be formed in the protruding member 24. For example, the female screw part is formed at a center of the protruding member 24.

According to this structure, when an operation object is to be attached to the coil holding body 4, the operation object can be attached to the coil holding body 4 in a further stable state by utilizing the engaging hook part 24c, the male screw part 24d or the female screw part. Further, in a case that the coil holding body 4 is attached to a host device, the coil holding body 4 can be attached to the host device in a further stable state by utilizing the engaging hook part 24c, the male screw part 24d or the female screw part. In FIGS. 8 and 9, the same reference signs are used for the same structure as the embodiment described above.

In addition, in the embodiment described above, a male screw part similar to the male screw part 24d may be formed in the protruded part 4b so as to protrude from the flat part 4k, or a female screw part similar to the female screw part formed in the protruding member 24 may be formed in the protruded part 4b so as to be recessed from the flat part 4k. According to this structure, in a case that an operation object is to be attached to the coil holding body 4, the operation object can be attached to the coil holding body 4 in a further stable state by utilizing the male screw part or the female screw part. Further, in a case that the coil holding body 4 is to be attached to a host device, the coil holding body 4 can be attached to the host device in a further stable state by utilizing the male screw part or the female screw part.

In the embodiment described above, the drive magnet pieces 16 and the magnetic piece 17 are formed in a circular ring shape and the shaft 18 is inserted and fixed to the through-holes 16a and 17a which are formed in their centers. However, the present invention is not limited to this embodiment. For example, the drive magnet pieces 16 and the magnetic piece 17 may be formed in a circular plate shape. In this case, the drive magnet part 3 is not required to provide with the shaft 18.

In the embodiment described above, the actuator 1 is formed in a substantially cylindrical columnar shape. However, the present invention is not limited to this embodiment. For example, the actuator 1 may be formed in a polygonal columnar shape such as a rectangular columnar shape. In this case, for example, the coil holding body 4 is formed in a substantially polygonal tube shape corresponding to the shape of the actuator 1, and the drive magnet part 3 is formed in a polygonal plate shape corresponding to the shape of the actuator 1. Further, in the embodiment described above, the magnetic piece 17 is disposed between two drive magnet pieces 16. However, a space may be formed between two drive magnet pieces 16 without having the magnetic piece 17 between two drive magnet pieces 16. Alternatively, opposed faces of two drive magnet pieces 16 may be abutted with each other.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An actuator comprising:
   a drive coil which is wound around in a tube shape;
   a drive magnet part which is disposed on an inner peripheral side with respect to the drive coil;
   a coil holding body which holds the drive coil; and
   a magnet holding body which holds the drive magnet part;
   wherein the coil holding body is linearly and relatively movable with respect to the magnet holding body;
   wherein when a relatively moving direction of the coil holding body with respect to the magnet holding body is referred to as a first direction, the coil holding body comprises a tube part in a tube shape whose inner peripheral side is penetrated through in the first direction, and the drive magnet part comprises two drive magnet pieces which are disposed so as to overlap with each other in the first direction and whose opposed faces in the first direction are magnetized in the same magnetic pole as each other, the drive magnet part being disposed on an inner peripheral side with respect to the tube part;
   wherein the drive coil is wound around on an outer peripheral side of the tube part so as to surround an entire periphery on an outer peripheral side of the drive magnet part;
   wherein the magnet holding body comprises:
      two holding body end face parts which are disposed on an outer side relative to the drive coil and the drive magnet part in the first direction and which structure both end faces of the magnet holding body in the first direction;
      a side face part which is disposed so as to surround an outer peripheral side of the drive coil and which structures an outer peripheral face of the magnet holding body in a radial direction of the tube part which is perpendicular to the first direction; and
      an opening part which is formed in one of the two holding body end face parts so as to penetrate in the first direction;
   wherein the drive magnet part comprises:
   a first drive magnet end face part and a second drive magnet end face part;
   wherein the second drive magnet end face part contacts a first holding body end face part of the two holding body end face parts;
   wherein a gap space is formed between the first drive magnet face part and a second holding body end face part of the two holding body end face parts;
      wherein the coil holding body is provided with a protruded part, a part of which is disposed in the opening part and which is protruded to an outer side in the first direction from one of the two holding body end face parts; and
      wherein the protruded part is formed so as to extend over the tube part in the radial direction of the tube part, and a flat part in a flat face shape which is perpendicular to the first direction is formed in the protruded part which is protruded from the end face part.

2. The actuator according to claim 1, further comprising a plate spring which connects the coil holding body with the magnet holding body,
   wherein the plate spring is provided with a coil side fixed part which is fixed to the coil holding body, a magnet side fixed part which is fixed to the magnet holding body, and an arm part which connects the coil side fixed part with the magnet side fixed part, wherein the magnet holding body comprises a first case which structures one of the two holding body end face parts and a part of the side face part and a second case which structures the other of the two holding body end face parts and a part of the side face part, the magnet holding body being structured by assembling the first case and the second case in the first direction, and wherein the magnet side fixed part is fixed between the first case and the second case in a sandwiched state by the first case and the second case.

3. The actuator according to claim 2, wherein the drive magnet part comprises:

a magnetic piece which is formed of soft magnetic material and is disposed between the two drive magnet pieces in the first direction so as to contact with the two drive magnet pieces; and a shaft which is inserted and fixed to through-holes penetrating through the two drive magnet pieces and the magnetic piece in the first direction.

4. The actuator according to claim 3, wherein a shaft insertion hole into which one end side of the shaft is inserted is formed in the end face part which is opposite to the end face part from which the protruded part of the coil holding body is protruded, and the one end side of the shaft is fixed to the shaft insertion hole.

5. The actuator according to claim 4, further comprising a spacer which is formed of resin material in a tube shape and is disposed between the drive coil and the side face part in the radial direction of the tube part, the spacer being fixed to the magnet holding body, wherein the coil holding body is formed with a flange part for preventing winding collapse of the drive coil on an outer side relative to the drive coil in the first direction so as to be enlarged relative to the drive coil to an outer side in the radial direction of the tube part, and wherein a gap space between an outer peripheral end of the flange part and an inner peripheral face of the spacer in the radial direction of the tube part is set to be narrower than a gap space between an outer peripheral face of the drive magnet part and an inner peripheral face of the tube part in the radial direction of the tube part.

6. The actuator according to claim 4, wherein the protruded part is formed with two terminal pins around which both end parts of the drive coil are respectively wound.

7. The actuator according to claim 6, wherein the coil holding body is formed with a flange part for preventing winding collapse of the drive coil so as to be enlarged relative to the drive coil to an outer side in the radial direction of the tube part, the protruded part is provided with a plurality of column parts which are protruded from the flange part in the first direction so as to interpose the drive magnet part in the radial direction of the tube part and a connecting part which connects the plurality of the column parts in the radial direction of the tube part, and the flat part which is perpendicular to the first direction is formed by the connecting part and the terminal pins are formed so as to protrude from the flat part.

8. The actuator according to claim 1, wherein the drive magnet part comprises:

a magnetic piece which is formed of soft magnetic material and is disposed between the two drive magnet pieces in the first direction so as to contact with the two drive magnet pieces; and a shaft which is inserted and fixed to through-holes penetrating through the two drive magnet pieces and the magnetic piece in the first direction.

9. The actuator according to claim 8, wherein a shaft insertion hole into which one end side of the shaft is inserted is formed in the end face part which is opposite to the end face part from which the protruded part of the coil holding body is protruded, and the one end side of the shaft is fixed to the shaft insertion hole.

10. The actuator according to claim 8, further comprising a spacer which is formed of resin material in a tube shape and is disposed between the drive coil and the side face part in the radial direction of the tube part, the spacer being fixed to the magnet holding body, wherein the coil holding body is formed with a flange part for preventing winding collapse of the drive coil on an outer side relative to the drive coil in the first direction so as to be enlarged relative to the drive coil to an outer side in the radial direction of the tube part, and wherein a gap space between an outer peripheral end of the flange part and an inner peripheral face of the spacer in the radial direction of the tube part is set to be narrower than a gap space between an outer peripheral face of the drive magnet part and an inner peripheral face of the tube part in the radial direction of the tube part.

11. The actuator according to claim 8, wherein the protruded part is formed with two terminal pins around which both end parts of the drive coil are respectively wound.

12. The actuator according to claim 1, further comprising a spacer which is formed of resin material in a tube shape and is disposed between the drive coil and the side face part in the radial direction of the tube part, the spacer being fixed to the magnet holding body, wherein the coil holding body is formed with a flange part for preventing winding collapse of the drive coil on an outer side relative to the drive coil in the first direction so as to be enlarged relative to the drive coil to an outer side in the radial direction of the tube part, and wherein a gap space between an outer peripheral end of the flange part and an inner peripheral face of the spacer in the radial direction of the tube part is set to be narrower than a gap space between an outer peripheral face of the drive magnet part and an inner peripheral face of the tube part in the radial direction of the tube part.

13. The actuator according to claim 12, further comprising a plate spring which connects the coil holding body with the magnet holding body, wherein the plate spring is provided with a coil side fixed part which is fixed to the coil holding body, a magnet side fixed part which is fixed to the magnet holding body, and an arm part which connects the coil side fixed part with the magnet side fixed part, wherein the magnet holding body comprises a first case which structures one of the two holding body end face parts and a part of the side face part and a second case which structures the other of the two holding body end face parts and a part of the side face part, the magnet holding body being structured by assembling the first case and the second case in the first direction, and wherein the magnet side fixed part is fixed between the first case and the second case in a sandwiched state by the first case and the second case.

14. The actuator according to claim 1, wherein the protruded part is formed with two terminal pins around which both end parts of the drive coil are respectively wound.

15. The actuator according to claim 14, wherein
the coil holding body is formed with a flange part for preventing winding collapse of the drive coil so as to be enlarged relative to the drive coil to an outer side in the radial direction of the tube part,
the protruded part is provided with a plurality of column parts which are protruded from the flange part in the first direction so as to interpose the drive magnet part in the radial direction of the tube part and a connecting part which connects the plurality of the column parts in the radial direction of the tube part, and
the flat part which is perpendicular to the first direction is formed by the connecting part and the terminal pins are formed so as to protrude from the flat part.

16. The actuator according to claim 1, wherein the protruded part is formed with one of an engaging hook part protruding from the flat part to an outer side in the first direction, a male screw part protruding from the flat part to an outer side in the first direction, and a female screw part which is recessed from the flat part to an inner side in the first direction.

17. The actuator according to claim 16, wherein one of a host device which holds the actuator and an operation object which is driven by the actuator is attached to one of the engaging hook part, the male screw part and the female screw part.

18. The actuator according to claim 1, further comprising a protruding member which is formed larger than the protruded part when viewed in the first direction and is fixed to the flat part,
wherein a second flat part in a flat face shape which is perpendicular to the first direction is formed on a protruding side from the end face part of the protruding member.

19. The actuator according to claim 18, wherein the protruding member is formed with one of an engaging hook part protruding from the second flat part to an outer side in the first direction, a male screw part protruding from the second flat part to an outer side in the first direction, and a female screw part which is recessed from the second flat part to an inner side in the first direction.

20. The actuator according to claim 19, wherein one of a host device which holds the actuator and an operation object which is driven by the actuator is attached to one of the engaging hook part, the male screw part and the female screw part.

21. The actuator according to claim 1, wherein one of a host device which holds the actuator and an operation object which is driven by the actuator is attached to the magnet holding body, and the other of the host device and the operation object is attached to the protruded part of the coil holding body.

* * * * *